Patented Nov. 7, 1950

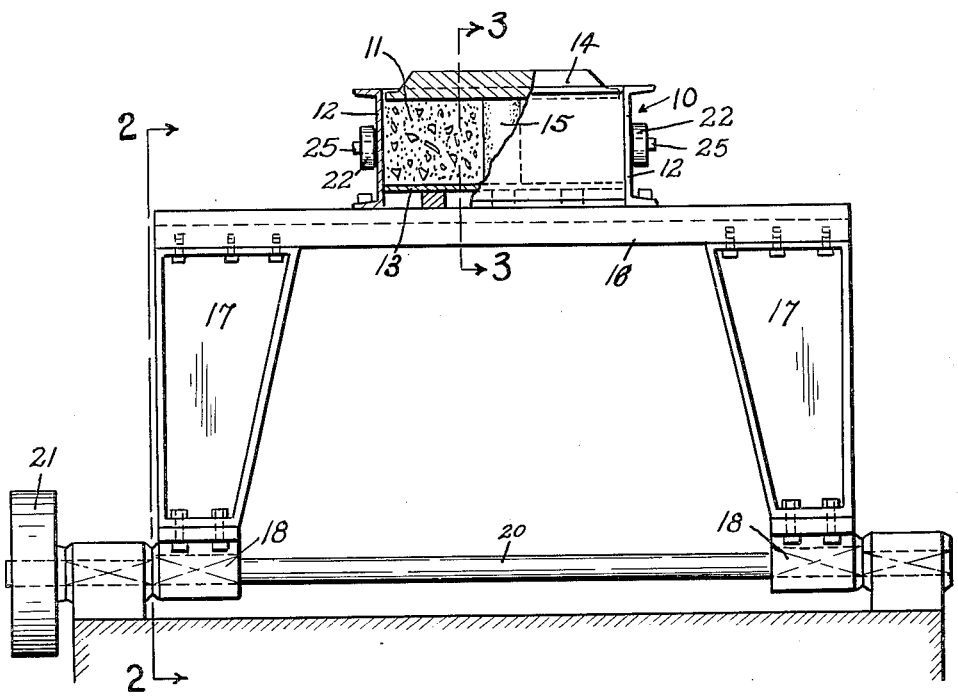
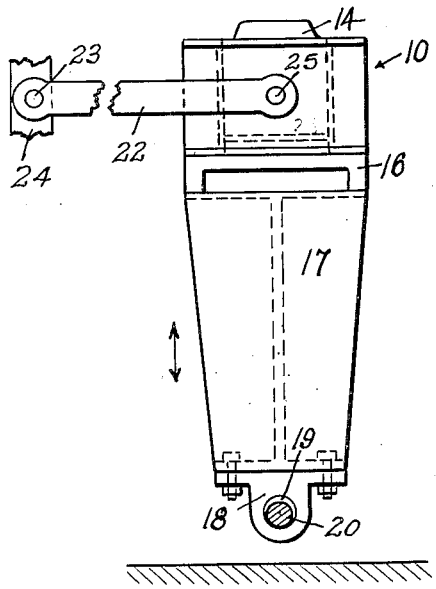
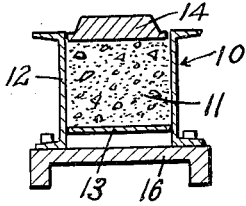

2,529,404

UNITED STATES PATENT OFFICE 2,529,404

METHOD OF AND APPARATUS FOR COMPACTING MATERIAL

Arthur B. Mays, Adrian, Mich.

Application April 26, 1947, Serial No. 744,229

11 Claims. (Cl. 25—41)

This invention relates to a method of and apparatus for compacting material. Primarily, the invention relates to packing cementitious building material into molds, and other operations where similar effects are desired.

An object of the invention is to provide a method and apparatus whereby a wide variety of cementitious articles may be produced in the same apparatus.

Another object is to provide a method and apparatus whereby the dense granules of such material may be closely fitted together to form a very dense block, if such is required, and equally readily porous granules can be fitted together in relation to be firmly held in a strong block without application of undue crushing force on the granules.

Another object of the invention is to provide a method and apparatus whereby the desired compacting of the material may be effected with a minimum of time and force, without using unnecessary and undesired crushing force or disintegrating force Other objects of the invention will appear as the description proceeds and the details are made known.

In the accompanying drawings forming a part of this specification,

Fig. 1 is a side elevation of one form of apparatus suitable for carrying out the method; Fig. 2 is an end view of the same apparatus on the line 2—2 of Fig. 1; Fig. 3 is a section on the line 3—3 of Fig. 1; and Fig. 4 is a diagrammatic illustration of the method of regulating the operation.

In the form of the device illustrated, the mold 10 is filled with cementitious material 11. While the material employed has been chiefly cement with various types and quantities of aggregate, it will be readily understood that other materials may be treated where essentially the same requirements are encountered.

As shown, the mold comprises sides 12, a bottom pallet 13 resting loosely therein and a top plate 14 resting loosely on top of the material. A core is indicated at 15. The sides are shown bolted to a support 16, which constitutes also a support for pallet 13 and so for the material in the mold. Extending downward from support 16 are legs 17 having boxes 18 in their lower ends. The boxes enclose eccentrics 19 on shaft 20 which is driven by any suitable means, such as belt pulley 21.

The mold and support are kept upright by links 22 pivoted at 23 to a fixed member 24 and at 25 to the mold, or to the support.

As will be seen, rotation of shaft 20 imparts through eccentrics 19 both lateral and vertical movements to the lower ends of legs 17. The lateral movement rocks the support about pivots 25, and the vertical movement raises and lowers the mold and bottom support for the material therein. Also, pivot 25 has a slight arcuate movement. This, with the rocking about pivots 25, imparts sufficient lateral movement to the mold to materially minimize the friction between the vertical inner faces of the mold and the adjacent granular material. While the inner mold faces are preferably substantially vertical, they move upward and downward so nearly in unison with the material therein that various departures may be made from the smooth vertical inner faces when desired.

Preferably the rotation of shaft 20 is quite rapid in order to get the full benefit of reduced friction due to the lateral movement of the mold walls, and in order to most effectively pack the material due to the vertical movement of the support. The apparatus is operated at such speed that the support lowers away from the material in the mold during its downward movement and encounters the drooping material during the upward movement of the support. In the arrangement shown, the pallet is loose in the mold and remains in contact with the material in the mold. This is generally preferable, but the pallet could be rigidly attached to the bottom support if due provision is made for ingress of air between pallet and material. Likewise, while the side walls of the mold are shown attached to the support and reciprocating vertically with it, the mold could move with the pallet or be otherwise supported, just so it gave lateral support to the material without disruptive friction from relative vertical movement.

One important feature of the invention is the relation of the R. P. M. of shaft 20 to the throw of eccentrics 19. Preferably, they are so related that shaft 20 makes one-half of a revolution while a free falling body would drop the distance of the eccentric throw, or one-half the distance the support drops. Referring to Fig. 4, if circle 26 about center 27 indicates the movement caused by the eccentric, the movement from starting point 28 to the half-way point 29 is twice that of from 27 to 28, or the throw of the eccentric. If the load moves down under the force of gravity a distance equal to 28—27 while the support moves down a distance equal to 28—29, then the load will continue down a distance equal to 27—30 until it is meet by the rising support at point 31 in the revolution of the eccentric, and this is found to be a surprisingly effective arrangement. Apparently it achieves the maximum of compacting force while avoiding any tendency to undo the compacting result by a disruptive upward travel of the particles.

As previously stated, best results are obtained by a rapid rotation of shaft 20, but there is no critical speed for this shaft, and its R. P. M. may be varied widely. The critical relation is between the R. P. M. and the throw of the cam. What the throw of the cam should be for any particular R. P. M. may be readily calculated to obtain the relation specified above. For example, suppose a R. P. M. of 1800 is found to be most readily available. Then one-half of a rotation will take 1/60 second. From the formula, the distance a body falls $= T^2 \times 192$ inches, it follows that a body would drop .053 inches during one-half revolution, and therefore that should be the distance 27—28, or the throw of the eccentric.

The relation specified is to obtain the correct relation of movements when the upwardly moving support contacts the falling material. The time of the drop 28 to 27 is to the time of the drop 28 to 30 as the square roots of those distances are to each other, and this proportion is substantially the same as that of 28—29 to 28—31 when the point 31 is at 230°, making the angle 31, 27, 32 equal to 40°. While this is the desired effective point, it is most easily obtained by the method outlined above.

Some variation may be permitted from the exact point 31, of course, but a greater R. P. M. in proportion to the throw, bringing the meeting point of support and load nearer point 32, rapidly increases the danger of disruptive upward movement being imparted to particles of the load, while fewer R. P. M., bringing the meeting point nearer point 29, decreases the upward impact of the support. The maximum compacting effect without disruptive danger is the most efficient operation, both because it best utilizes the time and force applied, but also because it obtains the maximum fitting together of the particles.

Any crushing of particles of aggregate is undesirable because it not only tends to eliminate pores which may be the very purpose of the aggregate, as indicated above, but also it may leave surfaces of aggregate improperly bonded by cement. The desired condition is the completest possible fitting together of aggregate particles with complete cementation together of fitting surfaces. This is defeated not only by crushing particles of aggregate, but also by any parting of the aggregate due to disruptive forces of material still moving upward when the mold and support stop their upward movement.

Theoretically, the upward movement of the support, which is greatest at point 32, is somewhat greater than will be completely damped by gravity between that point and 28. However, no detrimental disruption takes place at the said preferred relation of R. P. M. to throw, perhaps due to the plastic nature of the material and/or the force dissipated in rearrangement of particles. The result is not entirely understood, but it has been verified with cement and various kinds of aggregate including sand, gravel, broken stones, ashes, lava, etc., and so is true of a wide variety of materials.

When the upwardly moving support contacts the load and reverses the movement, the weight of the upper part of the load aids in compacting the bottom. The purpose of the top plate 14 is to insure sufficient packing effect on the upper part of the load, and it also may be employed, if desired, to give a desired configuration to the upper face of the compacted material.

While the particular apparatus disclosed is very simple and effective, many changes could be made while retaining many of the advantages of the invention. For example, the mold support could be suspended from eccentrics on an overhead shaft, and cranks, electrical means, or many other devices could be employed to give the support a vertical sinoidal movement, and still the important relation between R. P. M. and throw would hold true. Other changes may be made within the scope of the appended claims, which relate to a method of and apparatus for producing a tamping effect as distinguished from vibration of the mass to be compacted.

Having thus described my invention, what I claim as new, and desire to secure by United States Letters Patent, is:

1. The method of fitting together granules of material into a compact mass, which comprises confining a quantity of granules against lateral movement beyond certain limits, providing a support underneath the granules, and imparting a vertical sinoidal reciprocation to the support at such rate that the support moves downward faster than the granules drop by gravity and the support encounters the falling granules during the first half of the upward movement of the support.

2. The method of fitting together granules of material into a compact mass, which comprises confining a quantity of granules against lateral movement beyond certain limits, providing a support underneath the granules and imparting a vertical sinoidal reciprocation to the support at such rate that the support moves downward its full distance while a freely falling body will move approximately one-half that distance.

3. The method of fitting together granules of material into a compact mass, which comprises confining a quantity of granules against lateral movement beyond certain limits, providing a support underneath the granules and imparting a vertical sinoidal reciprocation to the support at such rate that the support moves downward faster than the granules drop by gravity and the support encounters the falling granules during the first half of the upward movement of the support, and vibrating laterally the lateral confining surfaces at such a speed as to minimize friction of relative vertical movement between said surfaces and the adjacent granules.

4. The method of fitting together granules of material into a compact mass, which comprises confining a quantity of granules against lateral movement beyond certain limits, providing a support underneath the granules and imparting a vertical sinoidal reciprocation to the support at such rate that the support moves downward its full distance while a freely falling body will move approximately one-half that distance, and vibrating laterally the lateral confining surfaces at such a speed as to minimize friction of relative vertical movement between said surfaces and the adjacent granules.

5. The method of fitting together granules of material into a compact mass, which comprises confining a quantity of granules against lateral movement beyond certain limits, providing a support underneath the granules and imparting a vertical sinoidal reciprocation to the support at such rate that the support moves downward its full distance while a freely falling body will move approximately one-half that distance, and providing a weighted surface resting on top of the granules and free to move vertically except for gravity and the support of the granules.

6. The method of compacting cementitious block forming material which comprises confining the material laterally between approximately vertical surfaces, providing a support underneath the material, and imparting to the support a vertical sinoidal movement at such a rate that the support moves downward faster than the material drops by gravity and the support encounters, stops, and reverses the movement of the falling material during the first half of the upward travel of the support and gravity substantially stops the upward travel of the material by the end of the upward travel of the support.

7. The method of compacting cementitious block forming material which comprises confining the material laterally between approximately vertical surfaces, providing a support underneath the material, and imparting to the support a vertical sinoidal movement at such a rate that the support moves downward its full distance in substantially the time a freely falling body will drop one-half that distance.

8. The method of compacting cementitious block forming material which comprises confining the material laterally between approximately vertical surfaces, providing a support underneath the material, and imparting to the support a vertical sinoidal movement at such a rate that the support moves downward its full distance in substantially the time a freely falling body will drop one-half that distance, and providing a weighted surface resting freely on the upper surface of said material.

9. Apparatus for fitting together granules of material which comprises means for confining laterally a quantity of said material, a support underneath the material, and means to impart to the support a vertical sinoidal movement, and means to rapidly vibrate the lateral confining means laterally a distance much less than the amplitude of the vertical reciprocation.

10. In combination, a mold for cementitious material, comprising sides fixed to a frame, eccentrics, means to impart to the mold a lateral vibration by the eccentrics but of much less amplitude than the throw of the eccentrics, a support for the material in the mold, and means to impart a vertical reciprocation from the eccentrics to the support equal in amplitude to the throw of the eccentrics.

11. In combination, a mold frame, boxes on the frame enclosing eccentrics with horizontal axes, a mold mounted on the frame and including sides and a bottom, an approximately horizontal link having one end pivoted to a fixed point and the other to the mold sides, whereby the mold sides are rocked laterally by the lateral throw of the eccentrics and the mold is reciprocated vertically by the vertical throw of the eccentrics, and a top fitting within the mold and resting on the material therein.

ARTHUR B. MAYS.

REFERENCES CITED

The following references are of record in the file of this patent:

UNITED STATES PATENTS

| Number | Name | Date |
| --- | --- | --- |
| 2,313,716 | Akers | Mar. 16, 1943 |
| 2,353,492 | O'Connor | July 11, 1944 |
| 2,397,695 | Schutt | Apr. 2, 1946 |